United States Patent
Peacemaker et al.

(10) Patent No.: US 12,240,421 B1
(45) Date of Patent: Mar. 4, 2025

(54) TWO SPEED TRAILER JACK WITH FRICTION CLUTCH

(71) Applicant: SOS Solutions, Inc., Tonasket, WA (US)

(72) Inventors: Samuel R. Peacemaker, Gilbert, AZ (US); Benjamin Peacemaker, Chandler, AZ (US); Travis Ernest Yoch, Woodbury, MN (US); Preston Elijan Collins-Holt, Saint Paul, MN (US); Casimir August Sienkiewicz, Minneapolis, MN (US)

(73) Assignee: SOS Solutions, Inc., Tonasket, WA (US)

( * ) Notice: Subject to any disclaimer, the term of this patent is extended or adjusted under 35 U.S.C. 154(b) by 0 days.

(21) Appl. No.: 18/905,066

(22) Filed: Oct. 2, 2024

(51) Int. Cl.
*B60S 9/08* (2006.01)
*B66F 3/10* (2006.01)

(52) U.S. Cl.
CPC . *B60S 9/08* (2013.01); *B66F 3/10* (2013.01)

(58) Field of Classification Search
CPC ..... B60S 9/08; B60D 1/66; B66F 3/10; B66F 3/20
See application file for complete search history.

(56) References Cited

U.S. PATENT DOCUMENTS

| | | | | |
|---|---|---|---|---|
| 5,035,094 | A * | 7/1991 | Legare | F16H 25/2056 343/903 |
| 6,685,169 | B2 * | 2/2004 | Shim | B66F 3/10 254/102 |
| 8,601,889 | B2 * | 12/2013 | Lessing | F16H 25/20 74/89.37 |
| 11,390,502 | B2 * | 7/2022 | Peacemaker | B60S 9/08 |
| 11,454,306 | B2 * | 9/2022 | Hu | B66F 3/10 |
| 11,691,857 | B2 * | 7/2023 | Peacemaker | B60S 9/08 254/424 |
| 2010/0192715 | A1 * | 8/2010 | Vauchel | F16H 25/2056 74/89.35 |
| 2016/0047446 | A1 * | 2/2016 | Hung | A47B 9/04 74/89.35 |
| 2022/0259019 | A1 * | 8/2022 | Lu | B66F 3/10 |
| 2022/0274814 | A1 * | 9/2022 | Li | B66F 3/10 |

* cited by examiner

*Primary Examiner* — Seahee Hong
(74) *Attorney, Agent, or Firm* — Snell & Wilmer LLP

(57) ABSTRACT

A linear jack includes a coarse nut threadedly coupled to a first rotating screw and a first sleeve mounted to the coarse nut (the first rotating screw, the first sleeve, and the coarse nut collectively a high-speed assembly), and a second sleeve threadedly coupled to a second rotating screw (the second sleeve and the second rotating screw collectively a low-speed assembly). The coarse nut is configured to operate in a first mode where the coarse nut is held from rotating with the first rotating screw to convert rotational motion of the first rotating screw into translating motion of the coarse nut and the first sleeve. The coarse nut is configured to operate in a second mode where the coarse nut rotates with the first rotating screw so that only the low-speed assembly operates to extend the second sleeve.

17 Claims, 11 Drawing Sheets

TWO SPEED TRAILER JACK WITH FRICTION CLUTCH

FIELD

The present disclosure relates generally to apparatuses such as jacks for lifting and suspending vehicles, trailers, and other large objects, and, more specifically, to linear jacks that are used to selectively lower and raise, for example, a portion of a trailer.

BACKGROUND

Many of the different types of trailers that are towed by trucks are connected to the trucks by a releasable coupling such as a gooseneck coupling, a fifth wheel coupling, a bumper pull coupling and the like. After the trailer is released from the truck and is no longer supported by the truck at the forward end of the trailer, a lifting device, such as a jack and/or landing gear assembly, is often used to support the trailer floor or bed, typically in a position generally horizontal to the ground.

A typical lifting device is attached to the trailer adjacent the truck coupling at the forward end of the trailer. The lifting device includes one or more vertically oriented columns and a vertical leg is mounted on the column. A hand crank is typically connected to the gear mechanism. Selectively rotating the hand crank lowers the leg until the leg contacts the ground and supports the forward end of the trailer when the trailer is being uncoupled from the truck, or raises the leg when the trailer has been connected to a truck and is ready for towing.

SUMMARY

One aspect of the subject matter described in this specification is embodied in a linear jack. The linear jack can include an outer tube, a first rotating screw, a coarse nut, a first sleeve, a second rotating screw, and a second sleeve. The outer tube can define a centerline axis. The first rotating screw is mounted to the outer tube. The first rotating screw can extend coaxially along the centerline axis. The coarse nut is threadedly coupled to the first rotating screw. The first sleeve is received at least partially into the outer tube. The first sleeve is configured to translate with respect to the outer tube between a retracted position and an extended position. The second rotating screw can be in coaxial alignment with the first rotating screw. The second rotating screw is configured to rotate together with the first rotating screw. The second sleeve can be received at least partially into the first sleeve. The second sleeve can be configured to translate with respect to the first sleeve between a second retracted position and a second extended position. The second sleeve is threadedly coupled to the second rotating screw. In a first mode, the first rotating screw and the second rotating screw rotate relative to the coarse nut so as to cause the coarse nut and the second rotating screw to translate relative to the first rotating screw.

These and other embodiments may optionally include one or more of the following features. In a second mode, a first friction force between a first contact surface of the coarse nut and a second contact surface of an end of the second rotating screw causes the coarse nut to rotate together with the second rotating screw and the first rotating screw. The second sleeve can be configured to translate with respect to the second rotating screw in response to rotation of the first rotating screw. In the first mode, the first sleeve can be configured to translate with respect to the outer tube in response to the first rotating screw rotating relative to the coarse nut. The second rotating screw can be slidingly coupled to the first rotating screw via a splined connection. The first rotating screw can be configured to drive rotation of the second rotating screw. The second rotating screw can be configured to translate with respect to the first rotating screw in response to rotation of the first rotating screw with respect to the outer tube. The second rotating screw can be configured to receive at least a portion of the first rotating screw. The linear jack can further include a friction clutch disposed between the first sleeve and the coarse nut. In the first mode, the friction clutch can secure the coarse nut from rotating together with the first rotating screw. The friction clutch can include a spring member compressed between an end of the first sleeve and the coarse nut so as to impart a second friction force to the coarse nut that resists rotation of the coarse nut with respect to the first sleeve. The spring member can be configured to impart a resistive force onto the coarse nut to resist rotation of the coarse nut together with the first rotating screw. A thread pitch of the first rotating screw is greater than a thread pitch of the second rotating screw. The linear jack can further include an insert disposed in the first sleeve. The insert provides a stopping surface that engages a head portion of the second rotating screw to stop the second rotating screw from translating with respect to the first sleeve. Turning the first rotating screw a first rotational direction extends the second sleeve from the first sleeve. Turning the first rotating screw a second rotational direction retracts the second sleeve into the first sleeve, regardless of the linear jack being in the first mode or the second mode. The outer tube, the first sleeve, the second sleeve, the first rotating screw, and the second rotating screw can be in coaxial alignment.

In another aspect, the subject matter is embodied in a method of manufacturing a linear jack. The method can include disposing a first rotating screw at least partially within a coarse nut, wherein the first rotating screw is threadedly coupled to the coarse nut. The method can include disposing a second rotating screw at least partially within a second sleeve, wherein the second rotating screw is threadedly coupled to the second sleeve. The method can include disposing the first rotating screw at least partially within the second rotating screw, wherein the first rotating screw is slidingly coupled to the second rotating screw via a splined connection. The method can include disposing the second sleeve at least partially within a first sleeve, wherein the second sleeve is configured to translate with respect to the first sleeve.

In various embodiments, the method further includes disposing the first sleeve within an outer tube, wherein the first sleeve is configured to translate with respect to the outer tube, and the second sleeve is configured to translate together with the first sleeve with respect to the outer tube. In various embodiments, the method further includes coupling the first rotating screw to the outer tube, wherein the first rotating screw is configured to rotate with respect to the outer tube. In various embodiments, the method further includes disposing a spring member between the first sleeve and the coarse nut, wherein the spring member is configured to impart a resistive force to the coarse nut which resists rotation of the coarse nut with respect to the first sleeve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be example in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
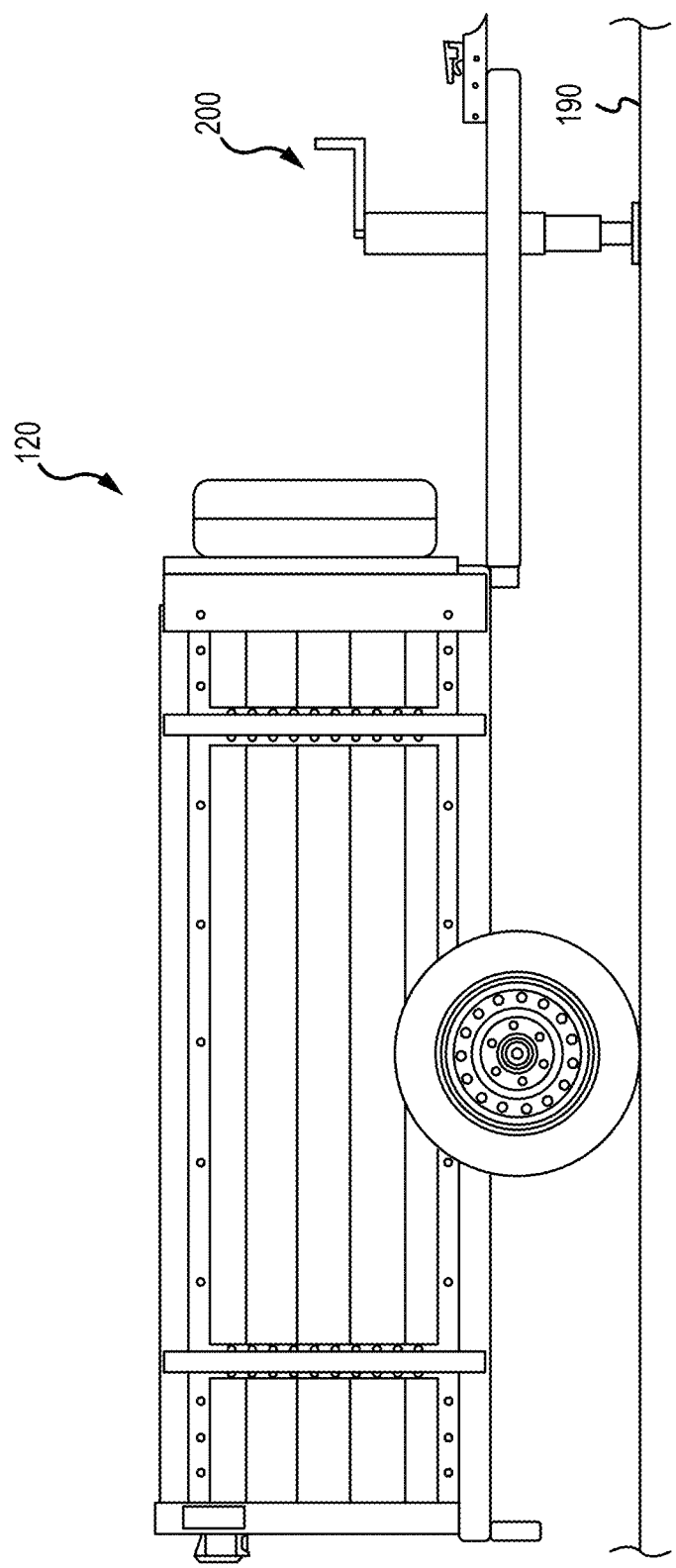
FIG. 1 is a schematic view of a trailer-mounted lifting device supporting a front end of a trailer on a ground surface, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Typical lifting devices, such as linear trailer jacks, operate using a constant thread pitch sized to obtain sufficient mechanical advantage to lift a heavy load, such as a trailer. In that regard, as a smaller thread pitch increases mechanical advantage relative to a larger thread pitch, many available linear trailer jacks use a constant, small thread pitch. However, the gain in mechanical advantage is offset by the increase in the number of rotations of an input device (e.g., a handle) needed to extend (translate) the linear trailer jack. In this manner, conventional linear trailer jack may provide the mechanical advantage desired to lift a trailer but at the expense of time consuming, and bothersome, turning.

Thread pitch, as used herein, is generally defined as the distance between threads on a threaded coupling, such as that found on a screw, lead screw, or jack screw. Thread count, expressed for example as threads per inch, is generally defined as the number of threads per inch of linear distance on a threaded coupling, such as that found on a screw, lead screw, or jack screw. In that regard, thread pitch and thread count are related, both expressing the spacing of threads about a screw, lead screw, or jack screw.

The terms "coarse nut" and "fine nut" are used herein to refer to threaded devices having helical ridges or threads disposed on an inner diameter surface thereof. As the name implies, a coarse nut has fewer threads per inch than a fine nut. In this regard, the terms "coarse" and "fine" each refer to a thread pitch of the respective nut.

Systems and methods for a two-speed lifting device—such as a linear trailer jack—are provided herein. A lifting device of the present disclosure generally comprises a high-speed assembly and a low-speed assembly. The high-speed assembly generally comprises a screw mechanism comprising a nut threadedly coupled to a screw. In various embodiments, the screw rotates and the nut translates. The screw and nut are threadedly coupled for translating the rotational force to a linear force. The low-speed assembly also comprises a nut threadedly coupled to a screw. A thread pitch of the high-speed assembly is greater than a thread pitch of the low-speed assembly, in various embodiments. In this manner, when driven by a common shaft and/or at the same revolutions per unit time, the high-speed assembly causes the lifting device to extend a greater linear distance per rotation of a shaft than the low-speed assembly.

In this manner, the high-speed assembly causes more linear extension per rotation and thus reduces the number of rotations needed to lower or raise the lifting device. This reduces or eliminates the wasted time incurred if no such high-speed assembly existed. However, in response to the lifting device beginning to touch the ground, and mechanical advantage now becomes more important, in various embodiments, the high-speed assembly is disengaged, for example, automatically disengaged. Thus, in response to the lifting device contacting a ground surface, a force is reacted into the high-speed assembly, thereby moving a moveable member of the high-speed assembly from a first position to a second position, and disengaging the high-speed assembly from being drivably coupled with the shaft and/or other motive rotational force. With the moveable member of the high-speed assembly in the second position, only the low-speed assembly is driven in response to rotation of the shaft, thereby benefiting from the mechanical advantage of the low-speed assembly, which has a smaller thread pitch than the high-speed assembly. In this manner, lifting devices of the present disclosure may quickly and efficiently extend in overall length, reducing the number of turns required to reach a ground surface, while still providing the mechanical advantage to lift heavy loads. In various embodiments, this transition occurs without any additional action and thus improves ease of use and reduces overall time needed for operation. In this manner, lifting devices of the present disclosure may automatically switch from a high-speed mode to a low-speed mode in response to the ground force being reacted through the lifting device (i.e., in response to contacting the ground as the jack is extended).

With reference to FIG. 1, a trailer 120 partially supported on a ground surface 190 by a lifting device 100 is illustrated, in accordance with various embodiments. Lifting device 100 may be coupled to a front end of the trailer 120. Lifting device 100 may be generally vertically oriented when supporting the front end of the trailer 120. Although illustrated coupled to a utility type trailer, lifting devices of the present disclosure may be utilized on any trailer or vehicle where support is desired, for example, with a camper, recreational vehicle, toy hauler, boat, or any other device capable of being towed as a trailer.

Figure 2:
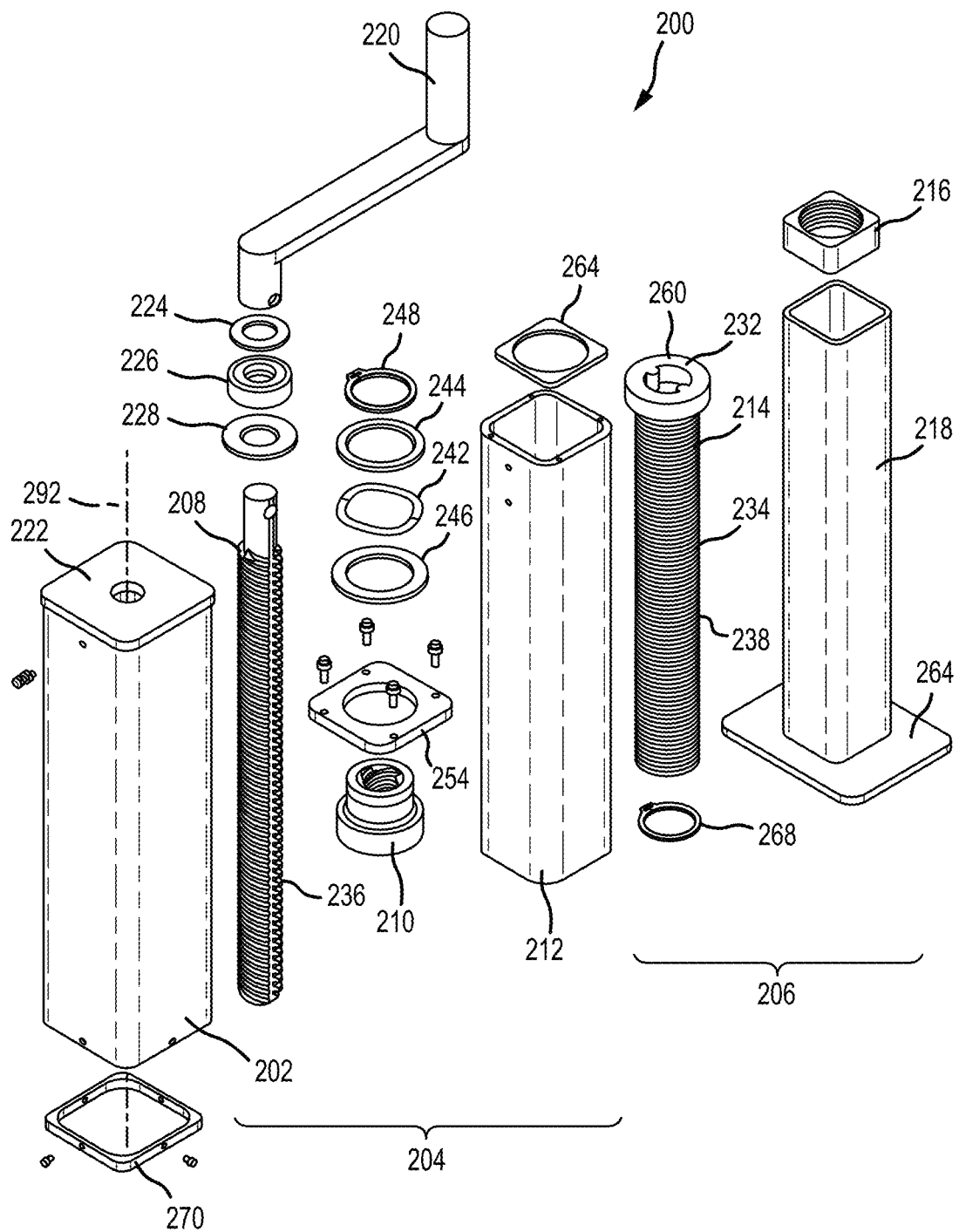
FIG. 2 is an exploded view of a lifting device, in accordance with various embodiments.

With reference to FIG. 2, an exploded view of a lifting device 200 is illustrated, in accordance with various embodiments. Lifting device 200 may be a linear jack. Lifting device 200 may generally comprise an outer tube 202, a high-speed assembly 204, and a low-speed assembly 206. The high-speed assembly 204 may generally comprise a screw mechanism comprising a first rotating screw 208 threadedly coupled to a coarse nut 210, in the manner of a leadscrew or jack screw. In various embodiments, high-speed assembly 204 comprises a first sleeve 212 configured to translate together with the coarse nut 210. The first sleeve 212 can be a translating sleeve configured to translate with respect to the outer tube 202. In various embodiments, the first sleeve 212 is secured from rotating with respect to the outer tube 202. The low-speed assembly 206 may generally comprise a screw mechanism comprising a second rotating screw 214 threadedly coupled to a fine nut 216. Low-speed assembly 206 may comprise a second sleeve 218 configured to translate together with the fine nut 216. The second sleeve 218 can be a translating sleeve configured to translate with respect to the outer tube 202 and/or the first sleeve 212. In various embodiments, the second sleeve 218 is secured from rotating with respect to the outer tube 202 and/or the first sleeve 212. The fine nut 216 can be coupled to the second sleeve 218, e.g., via a threaded connection, fasteners, and/or a metal joining process, such as welding, brazing, soldering, etc.

The outer tube 202 may define a centerline axis 292. The outer tube 202 is hollow and is configured to telescopingly receive the first sleeve 212 and the second sleeve 218. The first sleeve 212 may be disposed at least partially within the outer tube 202. The first sleeve 212 may be hollow. The second sleeve 218 may be disposed at least partially within first sleeve 212. The second sleeve 218 may be hollow. The second rotating screw 214 may be disposed at least partially within second sleeve 218. The second rotating screw 214 may be hollow. The first rotating screw 208 may be disposed at least partially within the second rotating screw 214. The first rotating screw 208 may be slidingly engaged with the second rotating screw 214. The second rotating screw 214 can be configured to rotate together with the first rotating screw 208 about the centerline axis 292. The inner dimension of the outer tube 202 may be greater than the outer dimension of the first sleeve 212. The inner dimension of the first sleeve 212 may be greater than the outer dimension of the second sleeve 218. The inner dimension of the second sleeve 218 may be greater than the outer dimension of the second rotating screw 214. The inner dimension of the second rotating screw 214 may be greater than the outer dimension of the first rotating screw 208. The outer tube 202, the first sleeve 212, the second sleeve 218, the second rotating screw 214, the coarse nut 210, and the fine nut 216 are coaxially aligned and/or substantially coaxially aligned, but in various embodiments coaxial alignment may not be present.

Figure 3A:
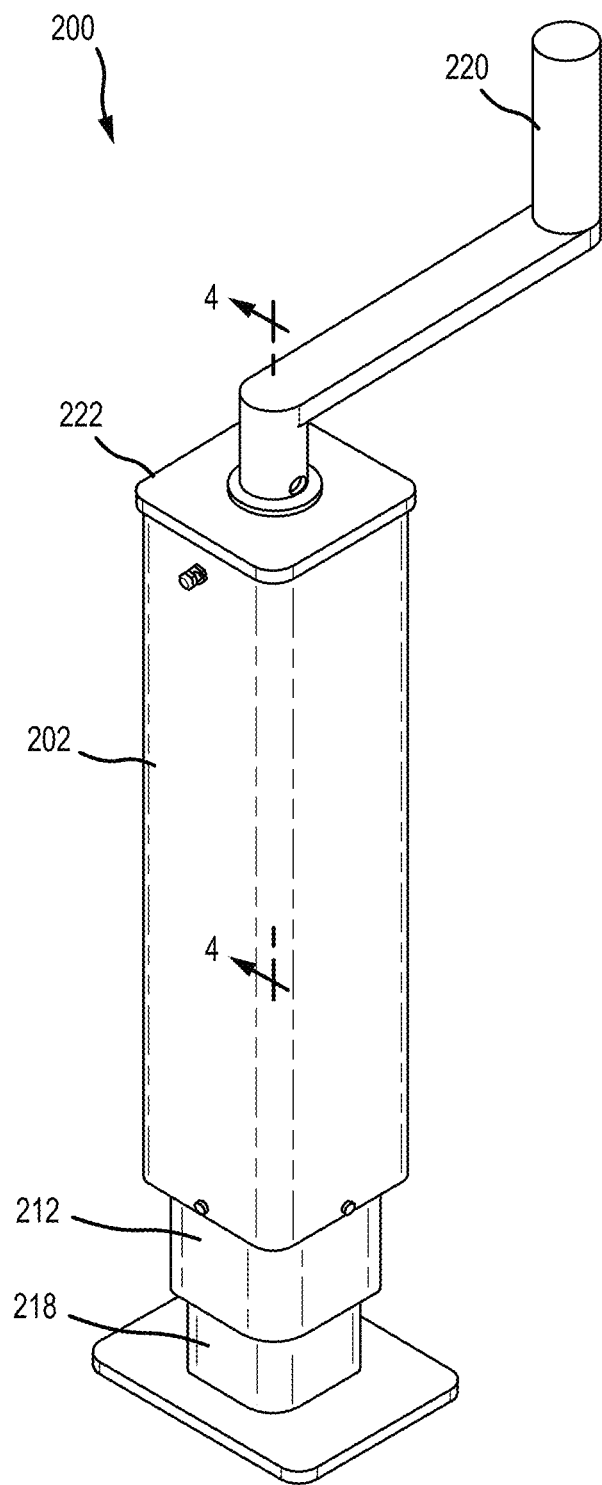
FIG. 3A, FIG. 3B, and FIG. 3C are perspective, side, and section views, respectively, of the lifting device in a retracted state, in accordance with various embodiments.
Figure 3B:
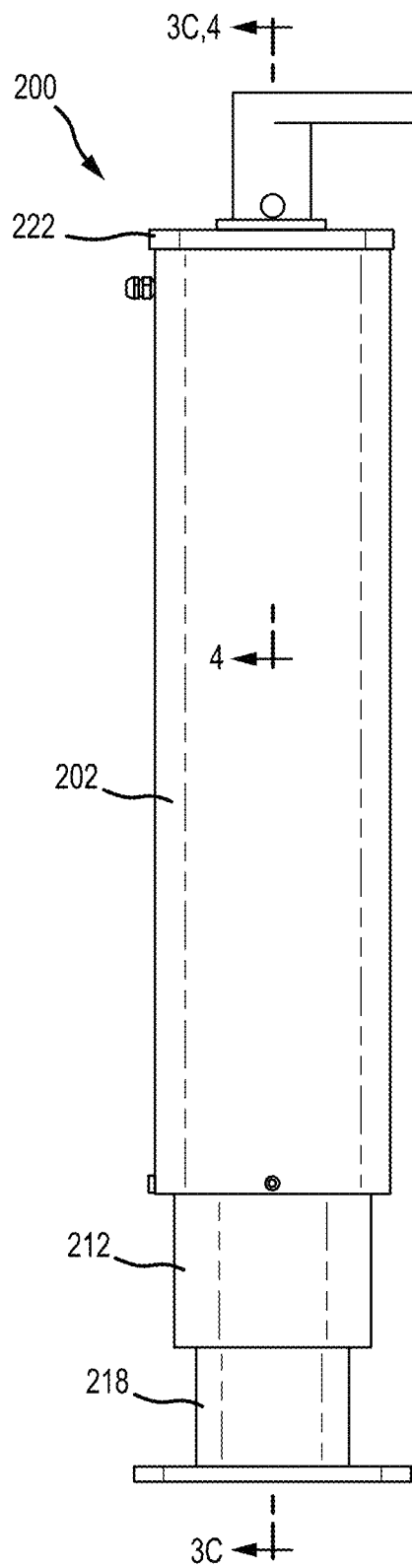
Figure 3C:
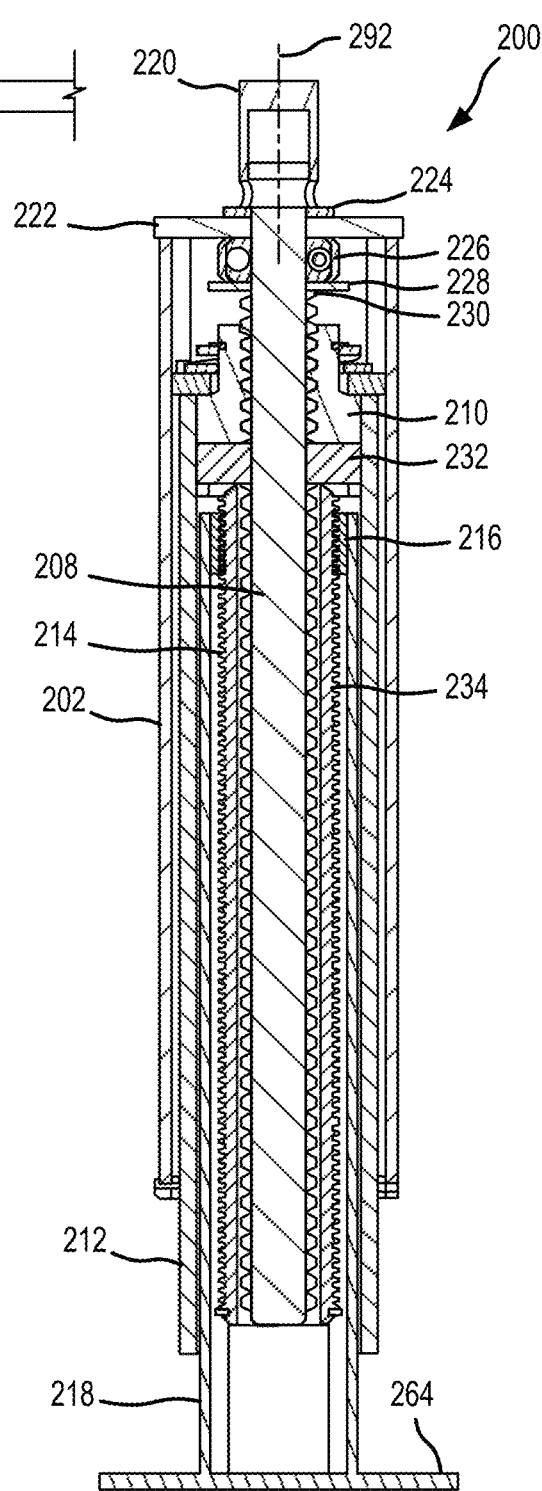
Figure 4A:
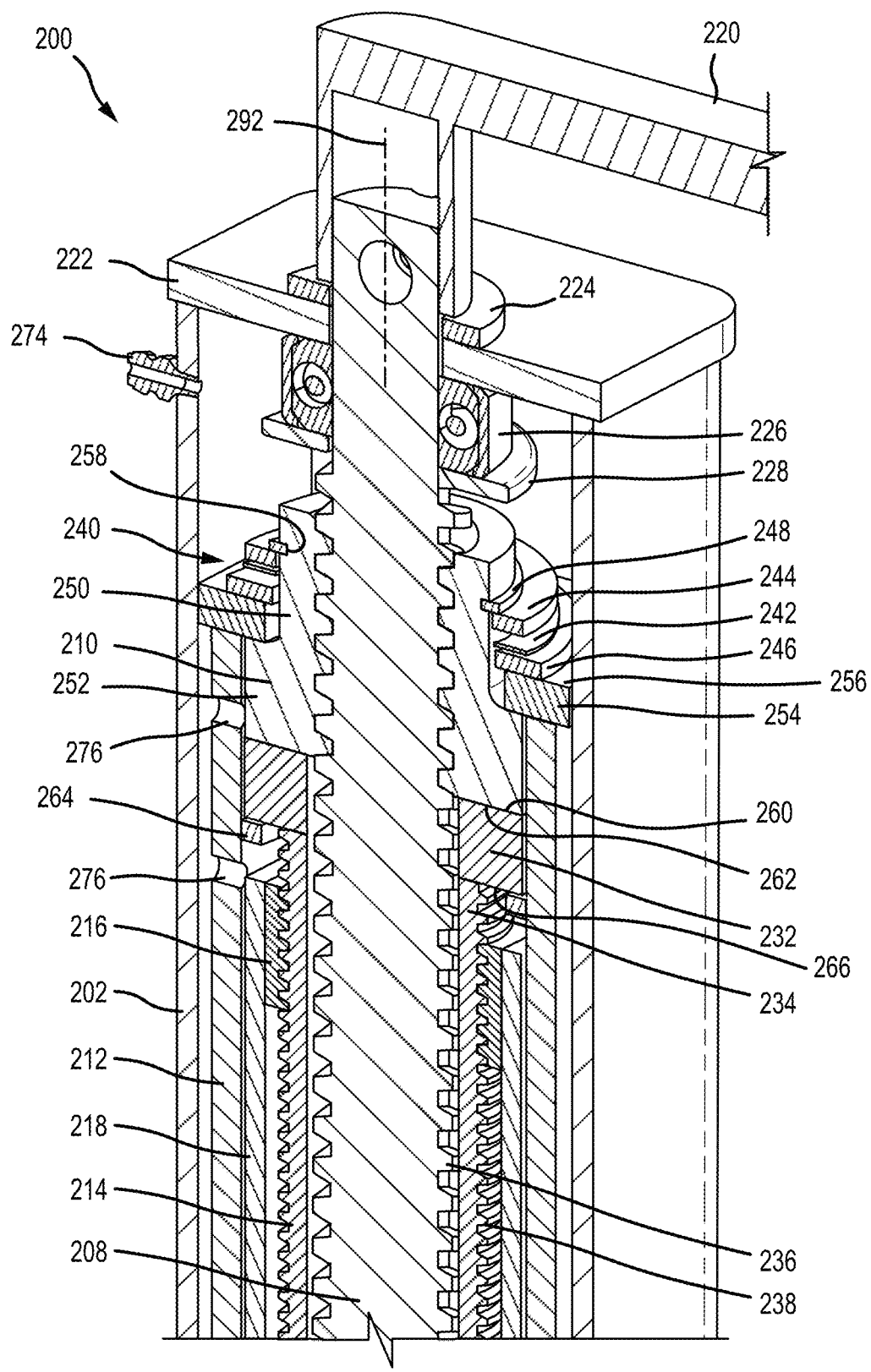
FIG. 4A and FIG. 4B are enlarged section views of the top portion of the lifting device of FIG. 3A and FIG. 3B, respectively, with the lifting device in a retracted state, in accordance with various embodiments.
Figure 4B:
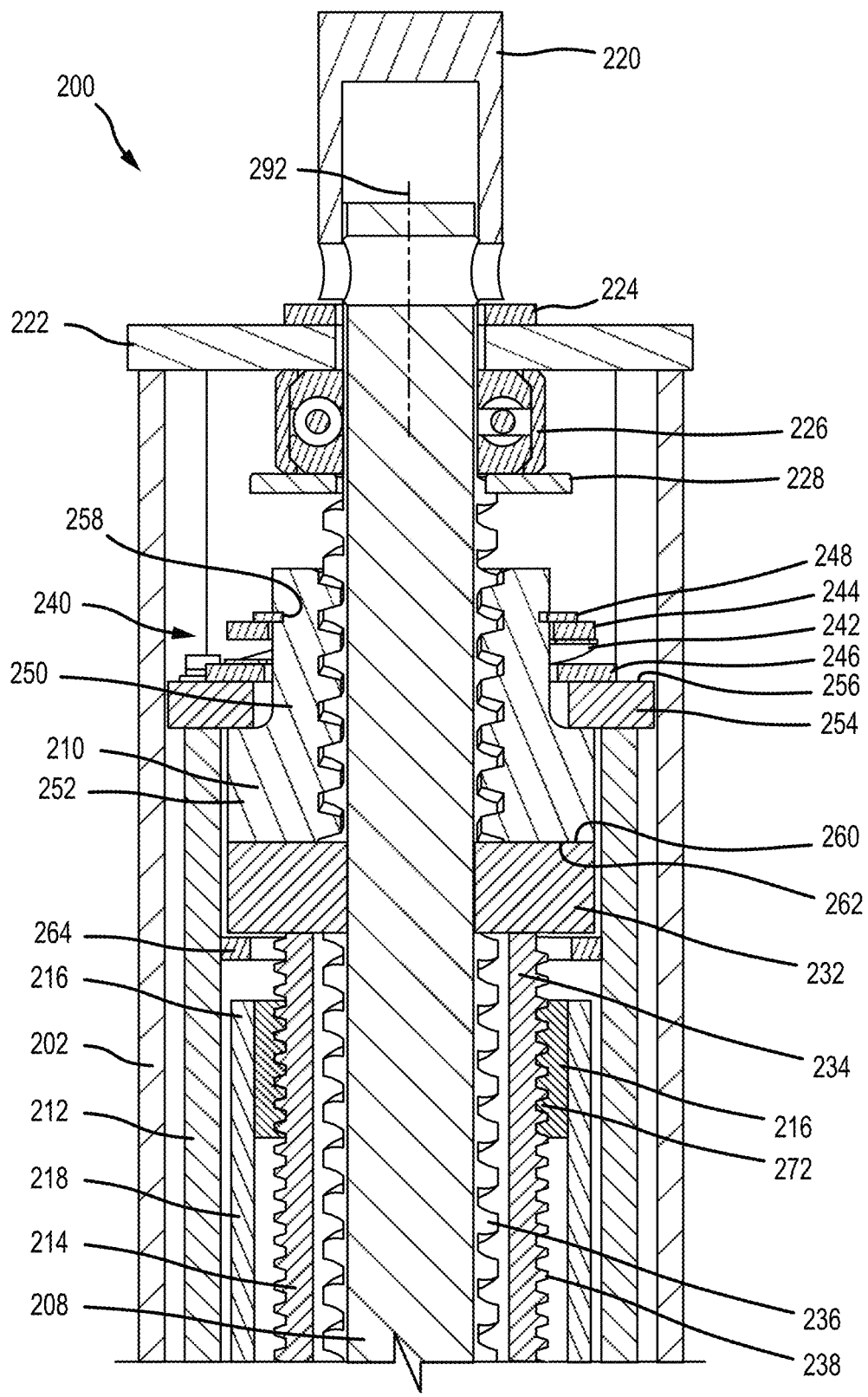

FIG. 3A, FIG. 3B, and FIG. 3C are perspective, side, and section views of the lifting device 200 in an assembled state and in a retracted position, in accordance with various embodiments. FIG. 4A and FIG. 4B are section views of an upper portion of the lifting device 200 in the assembled state and in the retracted position, in accordance with various embodiments. With combined reference to FIG. 2 through FIG. 4B, one end of the first rotating screw 208 may bear a handle 220 which may be used for rotating the first rotating screw 208. The handle 220 can be removably coupled to an upper end of the first rotating screw 208, which can aid in manufacturability and/or assembly of the lifting device 200. The outer tube 202 can include a retaining member, such as a cap 222 coupled to an upper end thereof. The cap 222 can be coupled to the outer tube 202, e.g., via a threaded connection, fasteners, and/or a metal joining process, such as welding, brazing, soldering, etc. The cap 222 may comprise a flange extending inward from an inner surface of outer tube 202. The first rotating screw 208 can extend through the cap 222. The first rotating screw 208 can be mounted to the outer tube 202 via the cap 222.

In various aspects, and with particular focus on FIG. 3C, a first washer 224 can be positioned at an outer surface of the cap 222. The first rotating screw 208 can extend through the cap 222 and the first washer 224. A bearing 226 can be located inside the outer tube 202. The bearing 226 can be located at an inner surface of the cap 222. The cap 222 can be sandwiched between the bearing 226 and the first washer 224. The bearing 226 can be sandwiched between the cap 222 and a second washer 228. The second washer 228 can contact a flange 230 on the first rotating screw 208 which prevents the second washer 228 from sliding along the first rotating screw 208 away from the cap 222. The bearing 226 can secure the first rotating screw 208 in position and facilitate rotation of the first rotating screw 208 about the centerline axis 292.

The coarse nut 210 can be threadedly coupled to the first rotating screw 208. Thus, rotation of the first rotating screw 208 can cause the coarse nut 210 to translate with respect to the outer tube 202 and the first rotating screw 208. The first sleeve 212 is coupled to the coarse nut 210 such that the first sleeve 212 translates together with the coarse nut 210 with respect to the outer tube 202 and the first rotating screw 208 between the retracted state (see FIG. 3C) and an extended state (see FIG. 8B). Stated differently, the high-speed assembly 204 translates rotational motion of the first rotating screw 208 to linear motion of the coarse nut 210 and the first sleeve 212.

Figure 5:
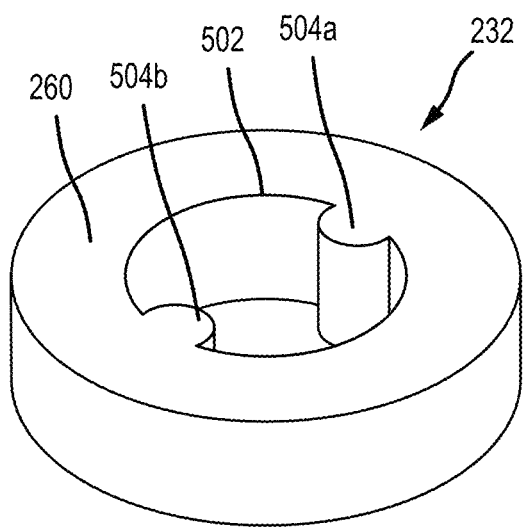
FIG. 5 is a perspective view of a head portion of a second rotating screw for a lifting device, in accordance with various embodiments.

The second rotating screw 214 can rotate together with the first rotating screw 208. The first rotating screw 208 can drive rotating of the second rotating screw 214. Stated differently, the first rotating screw 208 can be configured to impart a rotating force (e.g., a torque force) into the second rotating screw 214 to cause the second rotating screw 214 to rotate together with the first rotating screw 208. In various embodiments, the second rotating screw 214 is slidingly coupled to the first rotating screw 208 via a splined connection. The second rotating screw 214 can include a head portion 232 and a shaft portion 234. The head portion 232 can define an end of the second rotating screw 214. The head portion 232 can comprise a flange that extends outwardly from the shaft portion 234 to interface with the first sleeve 212. The flange can extend inwardly from the shaft portion 234 to interface with the first rotating screw 208. With momentary reference to FIG. 5, a perspective view of the head portion 232 is illustrated, in accordance with various embodiments. The head portion 232 can define a center aperture 502. The head portion 232 can include one or more splines, such as first spline 504a and second spline 504b, referred to collectively as splines 504. In various embodiments, the splines 504 include a pair of opposing splines 504 disposed at opposite sides of the aperture 502. The splines 504 can extend into the aperture 502. The splines 504 can be received into corresponding grooves disposed in the first rotating screw 208.

Figures 6A, 6B:
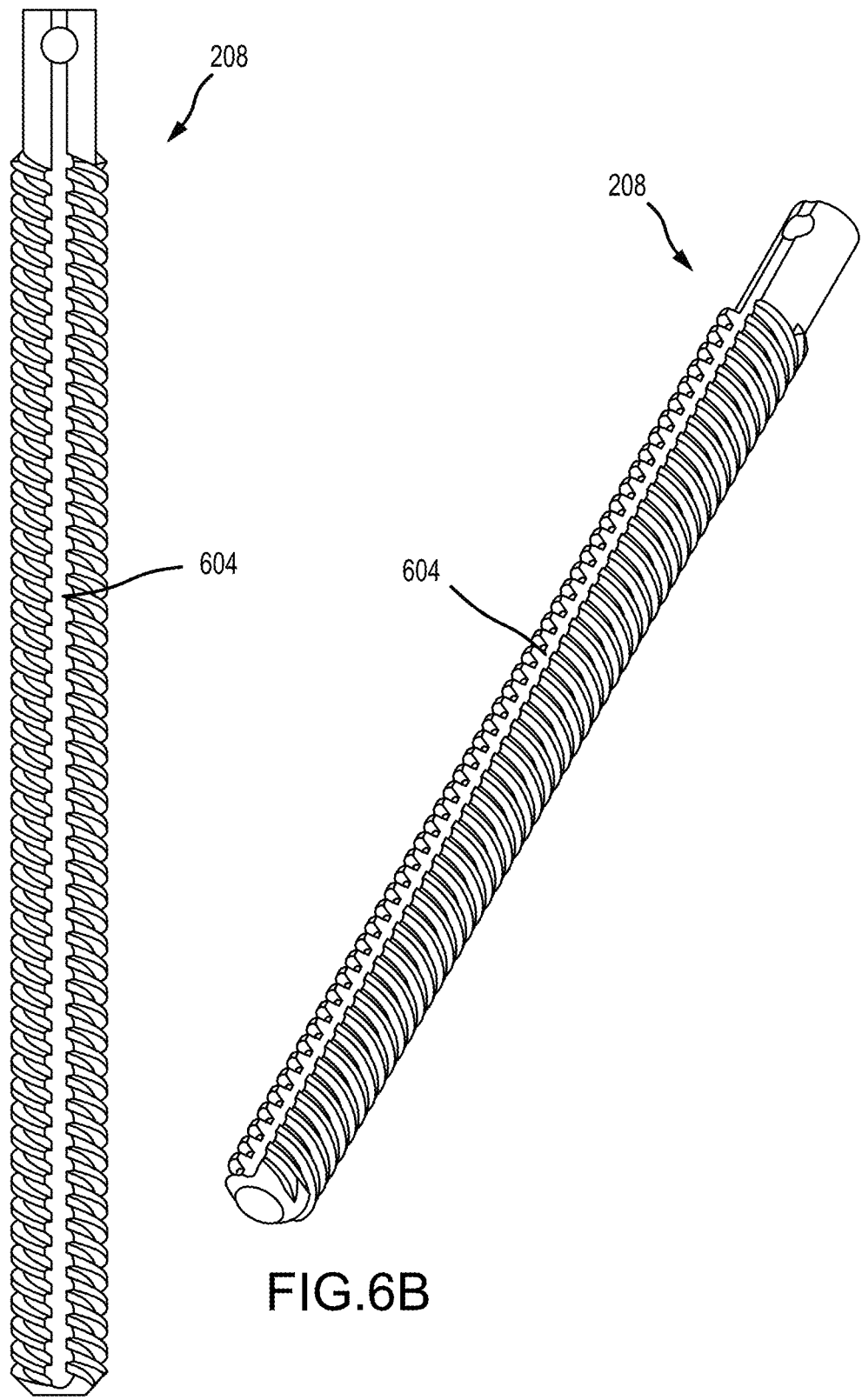
FIG. 6A and FIG. 6B are side and perspective views of a first rotating screw for a lifting device, in accordance with various embodiments.
Figure 7A:
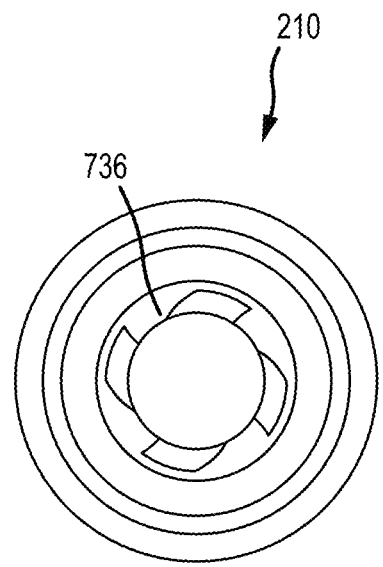
FIG. 7A, FIG. 7B, FIG. 7C, and FIG. 7D are top, side, top perspective, and bottom perspective views, respectively, of a coarse nut for a lifting device, in accordance with various embodiments.
Figure 7B:
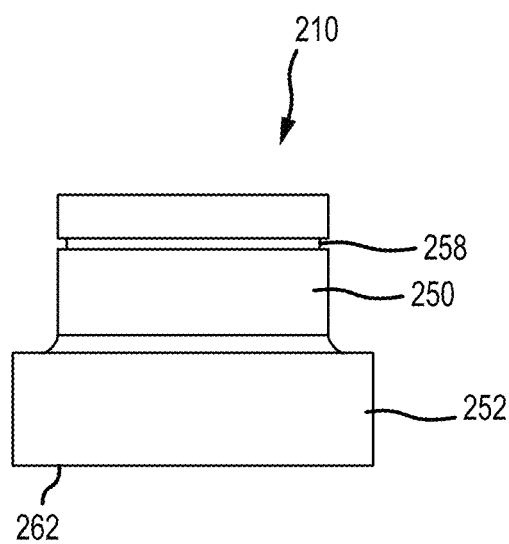
Figure 7C:
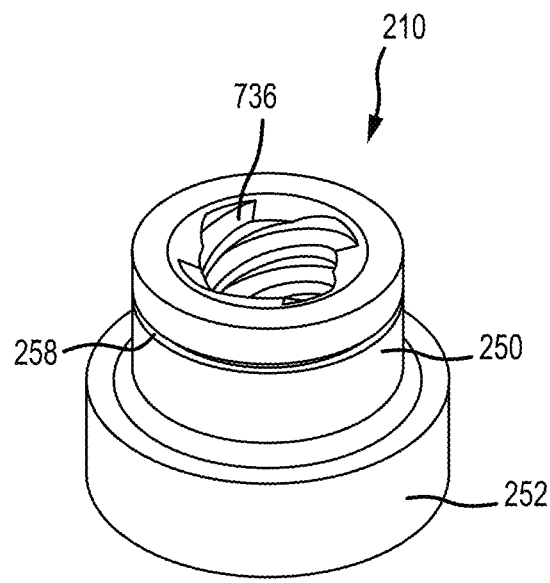
Figure 7D:
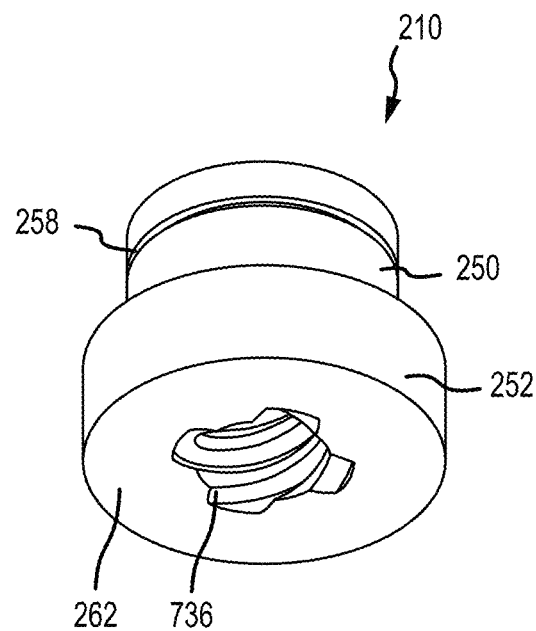

With momentary reference to FIG. 6A and FIG. 6B, side and perspective views, respectively, of the first rotating screw 208 are illustrated, in accordance with various embodiments. The first rotating screw 208 includes a threaded shaft with axially extending grooves 604. The grooves 604 are configured to accommodate the splines 504 of the head portion 232. The splines 504 can slide along the grooves 604. In this regard, the grooves 604 can accommodate sliding motion of the head portion 232 with respect to the first rotating screw 208, while also preventing rotation of the head portion 232 with respect to the first rotating screw 208. A torque force applied to the first rotating screw 208 can be transmitted into the head portion 232 via the splines 504 and the grooves 604 to cause the second rotating screw 214 to rotate together with the first rotating screw 208.

Although illustrated as having a pair of splines 504, the first rotating screw 208 may be operatively coupled to the head portion 232 such that the second rotating screw 214 rotates with the first rotating screw 208 in any suitable manner. For example, the splines 504 and the grooves 604 could be reversed such that the first rotating screw 208 may comprise one or more splines 504 and the head portion 232 may comprise a center aperture 502 comprising a geometry that is complementary to the splines 504. Any suitable connection is contemplated such that the first rotating screw 208 slidingly interlocks with the head portion 232 to impart rotational forces (i.e., torque) therebetween. Furthermore, although illustrated as having two opposing splines, the splined connection may comprise various geometries such as a star shaped pattern, triangular, square, or any other geometry that slidingly interlocks the head portion 232 with the first rotating screw 208.

With particular focus on FIG. 4A, the second sleeve 218 is threadedly coupled to the second rotating screw 214. The second sleeve 218 can be threadedly coupled to the second rotating screw 214 via the fine nut 216. For example, the fine nut 216 can be coupled to an inner surface of the second sleeve 218. Thus, rotation of the second rotating screw 214 causes the second sleeve 218 to translate with respect to outer tube 202 and the second rotating screw 214. Stated differently, the low-speed assembly 206 translates rotational motion of the second rotating screw 214 to linear motion of the second sleeve 218.

In various embodiments, the first rotating screw 208 comprises helically extending grooves and/or threads 236. In various embodiments, the second rotating screw 214 comprises helically extending grooves and/or threads 238. The thread pitch of threads 236 may be greater than the thread pitch of threads 238. Stated differently, the second rotating screw 214 may comprise more threads per inch (TPI) than the first rotating screw 208. In various embodiments, the thread pitch of the threads 236 is between 101% and 1000% as large as the thread pitch of the threads 238, though various embodiments, the thread pitch of the threads 236 is between 200% and 500% as large as the thread pitch of the threads 238. In various embodiments, the thread pitch of the threads 236 is more than twice as large as the thread pitch of the threads 238. In various embodiments, the thread pitch of the threads 236 is more than three times as large as the thread pitch of the threads 238. In various embodiments, the thread pitch of the threads 236 is more than four times as large as the thread pitch of the threads 238. It should be understood that the maximum thread pitch may be limited by the moment arm for torque applied to the first rotating screw 208 and may be limited to reduce the torque requirement for rotating the first rotating screw 208 below a desired threshold. In this manner, the high-speed assembly 204 translates further and faster per rotation of the first rotating screw 208 than the low-speed assembly 206, causing the lifting device 200 to reach a ground surface faster than if the high-speed assembly 204 were not present. Furthermore, in response to the lifting device 200 contacting a ground surface and the high-speed assembly 204 disengaging from the first rotating screw 208, the reduced thread pitch of the low-speed assembly takes advantage of the reduced torque required for extending the lifting device 200.

In various embodiments, the thread pitch of the threads 236 may be between 0.1 millimeters (mm) and 304.8 mm (between 0.0039 inches and 12 inches) in accordance with various embodiments, between 1 mm and 101.6 mm (between 0.039 inches and 4 inches) in accordance with various embodiments, between 2 mm and 76.2 mm (between 0.0787 inches and 3 inches) in accordance with various embodiments, and/or between 4 mm and 50.8 mm (between 0.157 inches and 2 inches) in accordance with various embodiments.

The thread pitch of the threads 238 may be between 0.1 millimeters (mm) and 279.4 mm (between 0.0039 inches and 11 inches) in accordance with various embodiments, between 1 mm and 25.4 mm (between 0.039 inches and 1 inch) in accordance with various embodiments, between 1 mm and 6.35 mm (between 0.039 inches and 0.25 inches) in accordance with various embodiments, and/or between 2 mm and 3.175 mm (between 0.0787 inches and 0.125 inches) in accordance with various embodiments.

Figures 8A, 8B:
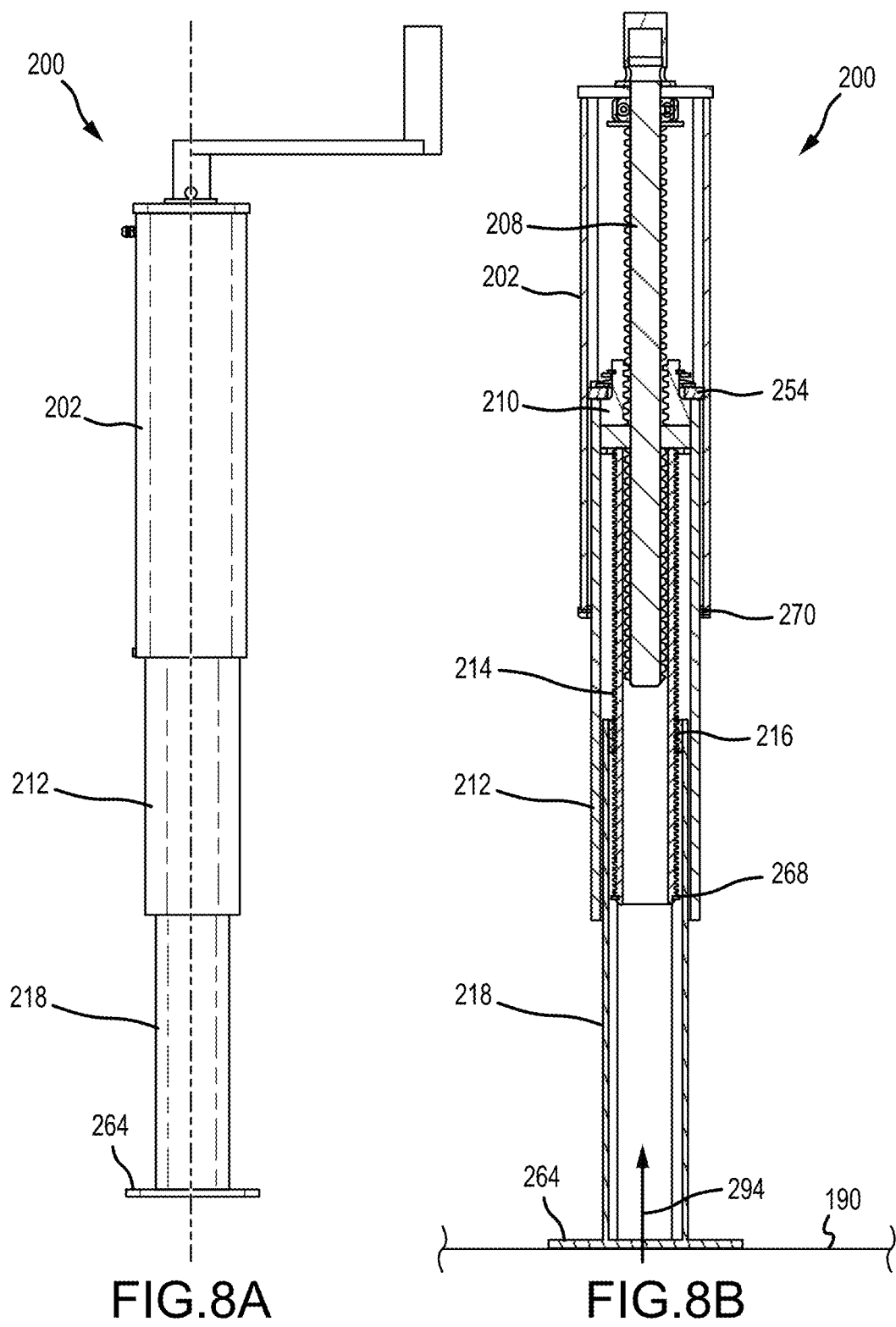
FIG. 8A and FIG. 8B are side and section views, respectively, of the lifting device in an extended state, in accordance with various embodiments.

In operation, rotation of the first rotating screw 208 in a first rotational direction, e.g., via the handle 220, causes the second rotating screw 214 to rotate therewith with respect to the outer tube 202 and the second sleeve 218, thereby causing the second sleeve 218 to extend from the first sleeve 212 and the outer tube 202 (see FIG. 8A and FIG. 8B). Conversely, rotation of the first rotating screw 208 in a second rotational direction (opposite the first rotational direction) causes the second rotating screw 214 to rotate therewith with respect to the outer tube 202 and the second sleeve 218, which in turn causes the second sleeve 218 to retract into the first sleeve 212 (see FIG. 3A, FIG. 3B, and FIG. 3C).

Furthermore, in a first mode with the head portion 232 of the second rotating screw 214 disengaged from the coarse nut 210, the coarse nut 210 can be restrained from rotating together with the first rotating screw 208 via a friction clutch 240 so that the coarse nut 210 translates with respect to the first rotating screw 208 and the outer tube 202 in response to rotation of the first rotating screw 208. The first sleeve 212 can be coupled to the coarse nut 210 such that the first sleeve 212 translates with respect to the first rotating screw 208 and the outer tube 202 together with the coarse nut 210. The second sleeve 218 and the second rotating screw 214 are mounted to the first sleeve 212 such that the second sleeve 218 and the second rotating screw 214 translate together with the first sleeve 212 with respect to the outer tube 202 and the first rotating screw 208. In this regard, in the first mode, rotation of the first rotating screw 208 causes the first sleeve 212 and the second sleeve 218 to extend or retract (depending on the rotational direction of the first rotating screw 208) with respect to the outer tube 202 via the high-speed assembly 204. In addition to extension and retraction of the second sleeve 218 with respect to the outer tube 202 via the high-speed assembly 204 in the first mode, rotation of the first rotating screw 208 causes the second sleeve 218 to extend or retract (depending on the rotational direction of the first rotating screw 208) with respect to the first sleeve 212 via the low-speed assembly 206.

In various embodiments, the friction clutch 240 includes a spring member 242 sandwiched between the first sleeve 212 and the coarse nut 210 so as to apply a friction force (e.g., a friction force that resists rotation of the coarse nut 210 with respect to the first sleeve 212) to the coarse nut 210 to prevent the coarse nut 210 from rotating with respect to the outer tube 202. The spring member 242 can be a wave washer having multiple waves per turn in various embodiments. The spring member 242 can be compressed between the coarse nut 210 and the upper end of the first sleeve 212. The spring member 242 can transfer a force between the coarse nut 210 and the first sleeve 212. For example, the spring member 242 can bias the coarse nut 210 in the axial direction (i.e., parallel with the centerline axis 292). In various embodiments, the coarse nut 210 can comprise a hollow shaft portion 250 having a threaded inner diameter surface configured to interface with the threads 236 of the first rotating screw 208. A flange 252 can extend outwardly from the hollow shaft portion 250. The flange 252 can be disposed in the first sleeve 212. The hollow shaft portion 250 can extend through a cap 254 of the first sleeve 212. The cap 254 can comprise a flange extending inward from the first sleeve 212. In various embodiments, the cap 254 and the first sleeve 212 are two separate pieces coupled together. In various embodiments, the cap 254 and the first sleeve 212 are formed as a single (e.g., monolithic) piece.

With momentary reference to FIG. 7A, FIG. 7B, FIG. 7C, and FIG. 7D, bottom, side, top perspective, and bottom perspective views of the coarse nut 210 are illustrated, in accordance with various embodiments. The coarse nut 210 can include helically extending grooves and/or threads 736. The thread pitch of the threads 736 can be the same as the thread pitch of threads 236 of the first rotating screw 208.

With particular reference again to FIG. 4A, in various embodiments, the spring member 242 is sandwiched between a first washer 244 and a second washer 246. The second washer 246 can contact an axially facing surface 256 of the cap 254. The first washer 244 can be captured between a lock ring 248 and the spring member 242. For example, the hollow shaft portion 250 can include a slot 258 configured to receive the lock ring 248. In this regard, the lock ring 248 can be captured within the slot 258 to prevent the lock ring 248 from moving axially with respect to the coarse nut 210. The spring member 242 can impart a friction force to the coarse nut 210 via the lock ring 248 to prevent the coarse nut 210 from rotating in the first mode.

Furthermore, in a second mode with the head portion 232 of the second rotating screw 214 engaged with the coarse nut 210, a torque force between the second rotating screw 214 and the coarse nut 210 can overcome the frictional force of the friction clutch 240 to cause the coarse nut 210 to rotate together with the first rotating screw 208 via a friction clutch 240 so that the coarse nut 210 no longer translates with respect to the first rotating screw 208 and the outer tube 202 in response to rotation of the first rotating screw 208. However, the coarse nut 210 is permitted to rotate with respect to the first sleeve 212 in the second mode. Although the coarse nut 210 and the first sleeve 212 is no longer translating with respect to the outer tube 202 in the second mode, the second rotating screw 214 continues to rotate with the first rotating screw 208 so that the second sleeve 218 translates with respect to the second rotating screw 214 and the outer tube 202. In this regard, in the second mode, rotation of the first rotating screw 208 causes the second sleeve 218 to extend or retract (depending on the rotational direction of the first rotating screw 208) with respect to the outer tube 202 via the low-speed assembly 206.

During operation, rotation of the first rotating screw 208 can cause the second sleeve 218 to extend. The second sleeve 218 can extend until the second sleeve 218 contacts a ground surface (e.g., see FIG. 1). In response to the second sleeve 218 contacting a ground surface, a counterforce can be transmitted up through the second sleeve 218, the second rotating screw 214, and into the coarse nut 210. When this counterforce (e.g., via a torque force imparted from the second rotating screw 214 to the coarse nut 210) overcomes the frictional force of the friction clutch 240 that resists rotation of the coarse nut 210 with respect to the outer tube 202 and the first sleeve 212, the coarse nut 210 begins to rotate together with the first rotating screw 208 and the second rotating screw 214 and no longer translates along the first rotating screw 208.

The head portion 232 can define an axially facing contact surface 260 configured to contact an axially facing contact surface 262 of the coarse nut 210. The contact surface 260 can face a first direction parallel to the centerline axis 292. The contact surface 262 can face a second direction parallel to the centerline axis 292, opposite the first direction faced by the contact surface 260. In various embodiments, the contact surface 260 and the contact surface 262 can each be oriented in a plane that is perpendicular to the centerline axis 292. The torque force can be imparted from the second rotating screw 214 to the coarse nut 210 via the first contact surface 260 and the second contact surface 262. In this regard, the first contact surface 260 and the second contact surface 262 can form a second "friction clutch" to impart rotational force from the second rotating screw 214 to the coarse nut 210 that overcomes the resistive friction force of the first friction clutch 240. In various embodiments, a surface roughness of the first contact surface 260 and/or the second contact surface 262 can be increased to increase friction between the second rotating screw 214 and the coarse nut 210 and to prevent the second rotating screw 214 from slipping with respect to the coarse nut 210 when in the second mode.

In operation and with the first sleeve 212 engaged with the coarse nut (e.g., with a ground force reacted through the first sleeve 212), rotation of the first rotating screw 208 does not drive translation of the coarse nut 210 and the first sleeve 212 with respect to the outer tube 202. In this regard, in the second mode, rotation of the first rotating screw 208 in the first rotational direction or the second rotational direction may cause only the second sleeve 218 (and not the first sleeve 212) to translate with respect to the outer tube 202 and the first rotating screw 208. Stated differently, the high-speed assembly 204 (i.e., the first sleeve 212) may be disengaged from operation in response to the second rotating screw 214 being engaged with the coarse nut 210 in the second mode. In this manner, in response to rotation of the first rotating screw 208 in the first direction, both the high-speed assembly 204 (i.e., including the first sleeve 212) and the low-speed assembly 206 (i.e., including the second sleeve 218) are driven to increase the overall length of lifting device 200 but, after reacting force from the ground through, for example, the second sleeve 218 and the second rotating screw 214, rotation of the first rotating screw 208 and the second rotating screw 214 is only imparted to the low-speed assembly 206 and not the high-speed assembly 204.

With momentary reference to FIG. 8A and FIG. 8B, as the overall length of the lifting device 200 is increased, the foot 275 of the lifting device 200, which can be attached to a lower end of the second sleeve 218, may contact a ground surface 190, thereby imparting a force 294 from the ground surface 190 into the second sleeve 218 and thereby the second rotating screw 214, which causes the second rotating screw 214 to move with respect to the coarse nut 210 from the first position (i.e., disengaged from the coarse nut 210) to the second position (i.e., engaged with the coarse nut 210) thereby coupling the coarse nut 210 with torque forces imparted by the second rotating screw 214. In this regard, before the lifting device 200 has contacted a ground surface, the overall length of the lifting device 200 is quickly increased to reduce the overall number of rotations of the first rotating screw 208 needed to cause lifting device 200 to reach the ground. In response to contacting the ground, the high-speed assembly 204 is decoupled from the first rotating screw 208 to take advantage of the mechanical advantage of the low-speed assembly 206. In this manner, time to operate is reduced relative to conventional designed and increased mechanical advantage is selectively activated.

With reference to FIG. 4A, the lifting device 200 can include a sleeve insert 264 disposed in the first sleeve 212. The sleeve insert 264 can extend from the inner surface of the sleeve insert 264. An axially facing surface 266 of the head portion 232 can contact the sleeve insert 264, particularly in the first mode before the lifting device 200 has contacted the ground. In response to the lifting device 200 (e.g., the foot 275) contacting the ground, the head portion 232 of the second rotating screw 214 can move away from the sleeve insert 264. The sleeve insert 264 can retain the second rotating screw 214 and the second sleeve 218 from sliding out of the first sleeve 212. In this regard, the sleeve insert 264 can provide a stopping surface to prevent the second rotating screw 214 from translating with respect to the first sleeve 212. The sleeve insert 264 can be coupled to the first sleeve 212, e.g., via a threaded connection, fasteners, and/or a metal joining process, such as welding, brazing, soldering, etc.

Various components of the lifting device 200 may be made from a metal or metal alloy, such as cast iron, steel, stainless steel, austenitic stainless steels, ferritic stainless steels, martensitic stainless steels, titanium, titanium alloys, aluminum, aluminum alloys, galvanized steel, or any other suitable metal or metal alloy. In this regard, the outer tube 202, the first sleeve 212, the second sleeve 218, the first rotating screw 208, and/or the second rotating screw 214 may be made from a metal or metal alloy. It is contemplated that various components of lifting device 200, such as the outer tube 202, may be made from a fiber-reinforced composite material.

With reference to FIG. 8B, a lock ring 268 can be attached to a lower end of the second rotating screw 214. For example, the lower end of the second rotating screw 214 can include a slot configured to receive the lock ring 268. The lock ring 268 can provide a stopping surface to prevent the fine nut 216 from decoupling from the second rotating screw 214. For example, as the second sleeve 218 reaches a fully extended position, the fine nut 216 can abut the lock ring 268 which prevents further rotation of the second rotating screw 214 with respect to the fine nut 216.

In various embodiments, the outer tube 202 can include an inner sleeve retainer 270 coupled to a lower end thereof. The retainer 270 can extend from an inner surface of the lower end of the outer tube 202. The retainer 270 can define a flange extending inward from the inner surface of the outer tube 202. The retainer 270 can provide a stopping surface to prevent the first sleeve 212 from decoupling from the first rotating screw 208. For example, as the first sleeve 212 reaches a fully extended position, the cap 254 of the first sleeve 212 can abut the retainer 270 which prevents further rotation of the first rotating screw 208 with respect to the coarse nut 210. In various embodiments, the retainer 270 and the outer tube 202 are two separate pieces coupled together. In various embodiments, the retainer 270 and the outer tube 202 are formed as a single (e.g., monolithic) piece.

With reference to FIG. 4B, the fine nut 216 may comprise helically extending ridges 272 (also referred to herein as threads). Threads 272 may be disposed on an inner diameter surface of the fine nut 216. The threads 272 may engage with complementary threads 238 disposed on the second rotating screw 214. Threads 272 and threads 238 may assist in translating rotational motion of the second rotating screw 214 into linear motion of the fine nut 216 and the second sleeve 218.

In various embodiments, the lifting device 200 can include one or more access points for lubricating or greasing one or more components of the lifting device 200. For example, an ingress 274, such as a grease zerk fitting, can be provided at an upper end of the outer tube 202 for applying grease to internal components of the lifting device 200. In various embodiments, one or more ingresses 276 can be formed in an upper end of the first sleeve 212 or applying grease to internal components of the first sleeve 212. The ingresses 276 can be holes (e.g., a threaded hole) configured to receive a grease zerk fitting, which can be installed when the first sleeve 212 is in an extended position. The zerk fitting can be removed from the first sleeve 212 after servicing the lifting device 200 to allow the first sleeve 212 to retract into the outer tube 202.

Benefits and other advantages have been described herein with regard to specific embodiments. Furthermore, the connecting lines shown in the various figures contained herein are intended to represent example functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A linear jack, comprising:
   an outer tube defining a centerline axis;
   a first rotating screw mounted to the outer tube and extending coaxially along the centerline axis;
   a coarse nut threadedly coupled to the first rotating screw;
   a first sleeve received at least partially into the outer tube, the first sleeve is configured to translate with respect to the outer tube between a first retracted position and a first extended position;
   a second rotating screw in coaxial alignment with the first rotating screw, the second rotating screw is configured to rotate together with the first rotating screw; and
   a second sleeve received at least partially into the first sleeve, the second sleeve is configured to translate with respect to the first sleeve between a second retracted position and a second extended position, and the second sleeve is threadedly coupled to the second rotating screw;
   wherein:
      in a first mode, the first rotating screw and the second rotating screw rotate relative to the coarse nut so as to cause the coarse nut and the second rotating screw to translate relative to the first rotating screw; and
      in a second mode, a first friction force between a first contact surface of the coarse nut and a second contact surface of an end of the second rotating screw causes the coarse nut to rotate together with the second rotating screw and the first rotating screw.

2. The linear jack of claim 1, wherein the second sleeve is configured to translate with respect to the second rotating screw in response to rotation of the first rotating screw.

3. The linear jack of claim 1, wherein, in the first mode, the first sleeve is configured to translate with respect to the outer tube in response to the first rotating screw rotating relative to the coarse nut.

4. The linear jack of claim 1, wherein the second rotating screw is configured to translate with respect to the first rotating screw in response to rotation of the first rotating screw with respect to the outer tube.

5. The linear jack of claim 4, wherein the second rotating screw is configured to receive at least a portion of the first rotating screw.

6. The linear jack of claim 1, further comprising a friction clutch disposed between the first sleeve and the coarse nut, and in the first mode the friction clutch secures the coarse nut from rotating together with the first rotating screw.

7. The linear jack of claim 6, wherein the friction clutch includes a spring member compressed between an end of the first sleeve and the coarse nut so as to impart a second friction force to the coarse nut that resists rotation of the coarse nut with respect to the first sleeve.

8. The linear jack of claim 1, wherein a first thread pitch of the first rotating screw is greater than a second thread pitch of the second rotating screw.

9. The linear jack of claim 1, further comprising an insert disposed in the first sleeve, the insert provides a stopping surface that engages a head portion of the second rotating screw to stop the second rotating screw from translating with respect to the first sleeve.

10. The linear jack of claim 1, wherein turning the first rotating screw a first rotational direction extends the second sleeve from the first sleeve, and turning the first rotating screw a second rotational direction retracts the second sleeve into the first sleeve, regardless of the linear jack being in the first mode or the second mode.

11. The linear jack of claim 1, wherein the outer tube, the first sleeve, the second sleeve, the first rotating screw, and the second rotating screw are in coaxial alignment.

12. A linear jack, comprising:
   an outer tube defining a centerline axis;
   a first rotating screw configured to rotate relative to the outer tube;
   a coarse nut threadedly coupled to the first rotating screw;
   a first sleeve received at least partially into the outer tube, the first sleeve is configured to translate with respect to the outer tube between a retracted position and an extended position;
   a second rotating screw configured to rotate together with the first rotating screw; and
   a second sleeve received at least partially into the first sleeve, the second sleeve is threadedly coupled to the second rotating screw;
   wherein, in a first mode, the first rotating screw and the second rotating screw rotate relative to the coarse nut so as to cause the coarse nut and the second rotating screw to translate relative to the first rotating screw.

13. The linear jack of claim 12, wherein, in a second mode, a first friction force between a first contact surface of the coarse nut and a second contact surface of an end of the second rotating screw causes the coarse nut to rotate together with the second rotating screw and the first rotating screw.

14. The linear jack of claim 12, wherein, in the first mode, the first sleeve is configured to translate with respect to the outer tube in response to the first rotating screw rotating relative to the coarse nut.

15. The linear jack of claim 12, wherein:
   the first rotating screw is configured to drive rotation of the second rotating screw;

the second rotating screw is configured to translate with respect to the first rotating screw in response to rotation of the first rotating screw with respect to the outer tube; and the second sleeve is configured to translate with respect to the second rotating screw in response to rotation of the first rotating screw.

16. The linear jack of claim 12, wherein the second rotating screw is slidingly coupled to the first rotating screw via a splined connection.

17. The linear jack of claim 12, further comprising a spring member disposed between the first sleeve and the coarse nut, the spring member is configured to impart a resistive force onto the coarse nut to resist rotation of the coarse nut together with the first rotating screw.

* * * * *